May 1, 1962    W. M. HEPBURN    3,032,326
TWO-STAGE COMBUSTION DIRECT FIRED AND RADIANT TUBE FURNACE
Filed July 15, 1954    2 Sheets-Sheet 1

INVENTOR.
W. M. Hepburn
BY
Charles S. Haughey

May 1, 1962 W. M. HEPBURN 3,032,326
TWO-STAGE COMBUSTION DIRECT FIRED AND RADIANT TUBE FURNACE
Filed July 15, 1954 2 Sheets-Sheet 2

INVENTOR.
W. M. Hepburn
BY
Charles Haughey

United States Patent Office 3,032,326
Patented May 1, 1962

3,032,326
TWO-STAGE COMBUSTION DIRECT FIRED AND RADIANT TUBE FURNACE

William M. Hepburn, Toledo, Ohio, assignor, by mesne assignments, to Midland-Ross Corporation, Cleveland, Ohio, a corporation of Ohio
Filed July 15, 1954, Ser. No. 443,518
17 Claims. (Cl. 263—42)

This invention relates to heating of metal in furnaces, and more particularly to utilizing products of combustion to provide an atmosphere to protect the work, the said atmosphere being generated from fuel utilized to heat the work.

Direct fired furnaces must admix sufficient air with the fuel to supply adequate heat to the furnace, but in so doing they produce a lean flue gas, such as one resulting from stoichiometric mixtures or slightly rich fuel-air mixtures. If a fuel-air mixture sufficiently rich in fuel to produce a rich flue gas were burned, the resulting heat of combustion would be inadequate to heat the furnace and the work to the usual temperatures desired.

By burning fuel in two steps or stages, the fuel can be initially direct fired into the heating chamber to initially produce a rich atmosphere and release some heat in the heating chamber, and subsequently burned in radiant tubes to complete combustion in an auxiliary combustion chamber which radiates heat into the heating chamber and completely burns the fuel to obtain in full the available heat of combustion therefrom, but exhausts the products of stoichiometric combustion without delivering the same to the atmosphere surrounding the work to be heated.

For a further consideration of what I believe to be novel and my invention, attention is directed to the following portion of the specification, drawing and claims.

Figure 1:
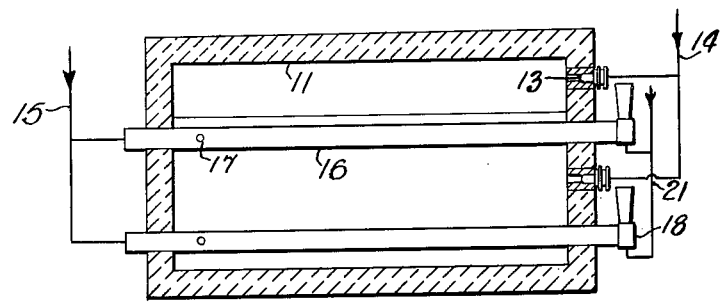
FIG. 1 is a vertical, longitudinal sectional view of a furnace embodying this invention.
Figure 2:
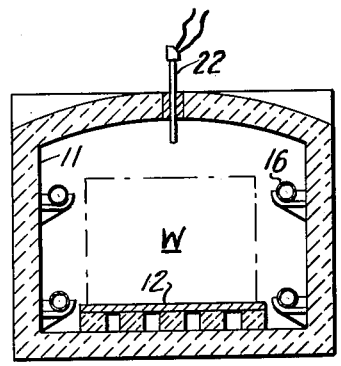
FIG. 2 is a vertical, lateral sectional view of a furnace embodying this invention.
Figure 3:
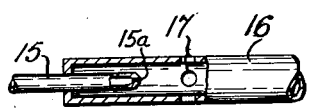
FIG. 3 is a partially sectioned longitudinal view of the inlet end of a tube shown in FIG. 1.

The furnace represented by walls 11 of FIGS. 1 and 2 is a direct fired, atmosphere furnace wherein work schematically represented at W is supported on a hearth 12. The furnace may be of either the batch or continuous type, but is here represented as a batch type furnace. Atmosphere and some heat is supplied to the furnace chamber by burner nozzles 13, which receive a rich mixture of fuel and air suitable for producing the desired atmosphere through supply pipe 14. Air for combustion, or an over-ventilated mixture of fuel and air, is delivered by supply pipe 15 to air nozzle 15a located at the inlet end of radiant tubes 16 wherein atmosphere from the furnace is admitted through ports 17 within the furnace chamber and burned in the tube with the air, or excess air, delivered by air nozzle 15a. Products of combustion are exhausted from the tube 16 to without the chamber by an eductor 18 at its exhaust end which is operated by air under pressure delivered thereto by pipe 21. Alternatively an exhaust fan could be coupled to the exhaust end of the tubes 16 to exhaust products of combustion therefrom. The furnace will ordinarily be controlled responsive to a thermocouple 22 shown in the furnace roof in FIG. 2. While the radiant tube may be of any material suitable to the conditions, such as temperature and atmosphere, to which it is subjected, the design as shown is particularly advantageous for use of ceramic materials such as silicon carbide to heat ferrous metals to forging temperatures. The tubes may be supported at intervals along its length on the side wall of the furnace as shown in FIG. 2, or a compression support of tubular segments as taught in patent to Weaver 2,598,283 may be used.

Figure 4:
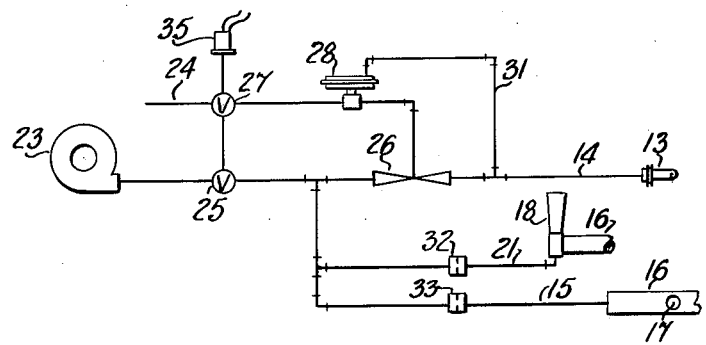
FIG. 4 is a schematic control diagram for control of the furnace of FIG. 1.

A preferred control arrangement for the furnace of FIGS. 1 and 2 is illustrated in FIG. 4 wherein the elements common to FIGS. 1 and 2 are identified by corresponding numbers. Air under pressure is supplied by a blower 23 and fuel, for example natural gas, is supplied from a gas supply pipe 24. Air from the blower 23 is supplied at constant pressure to a valve 25, thence to a mixer, inspirator 26, and thence to pipe 14 for delivery to one or more burner nozzles 13. Fuel from pipe 24 is delivered to a valve 27, thence to a pressure regulator 28 and thence to the inspirator 26. The pressure regulator 28 is of the "zero" type and is pressure loaded to downstream of the inspirator 26 by a conduit 31 in the usual manner to produce a suitable pressure for proportional mixing of the gas with air in the inspirator 26. A second stream of air drawn from between the valve 25 and the inspirator 26 is delivered through a flow proportioning orifice 32 to pipe 21 for operation of one or more eductors 18, and a third air stream from between the valve 25 and the inspirator 26 is delivered through a flow proportioning orifice 33 to pipe 15, and thence to the inlet end of one or more tubes 16 for combustion with fuel gas therein in the form of atmosphere drawn through ports 17 from the furnace chamber. In operation of the furnace, a temperature control instrument of standard type, not shown, is connected to a motor 35 to operate the same responsive to the thermocouple 22 in the furnace, or to an equivalent heat responsive device. The motor 35 simultaneously operates valves 25 and 27 towards open or towards closed position, as may be required by the temperature control instrument. The gas control valve 27 preferably opens further than the air valve so that it is primarily a safety shut-off valve for the off position, and the flow of gas therethrough is proportioned to the flow of air through the inspirator 26, hence through the valve 25. Air flowing through valve 25 is proportionally split between three streams, to the burner nozzle 13, the eductor 18 and the inlet end of the radiant tube 16 due to the proportioning orifices 32 and 33 and inspirator 26 so that combustion conditions within the furnace and within the radiant tube are maintained constant through changes in the rate of combustion of fuel.

Figure 5:
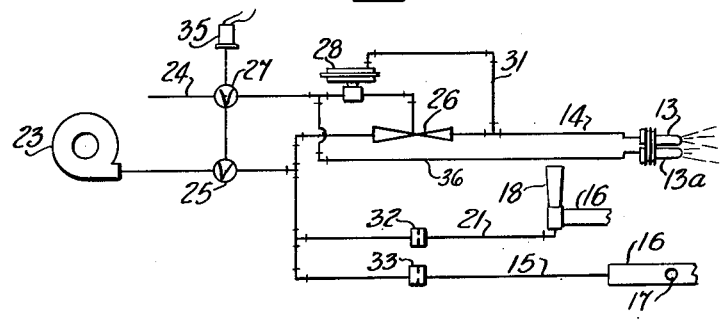
FIG. 5 is a schematic control diagram for an alternate control of the furnace of FIG. 1.

An alternate control system is illustrated in FIG. 5 wherein the burner is a two part burner having a stoichiometric burner nozzle 13 and a raw gas nozzle 13a. The fuel from valve 27 is proportioned between the inspirator 26 and pipe 36 leading to the raw fuel nozzle 13a. This system provides a positive burner operation and safe ignition at all times.

Figure 6:
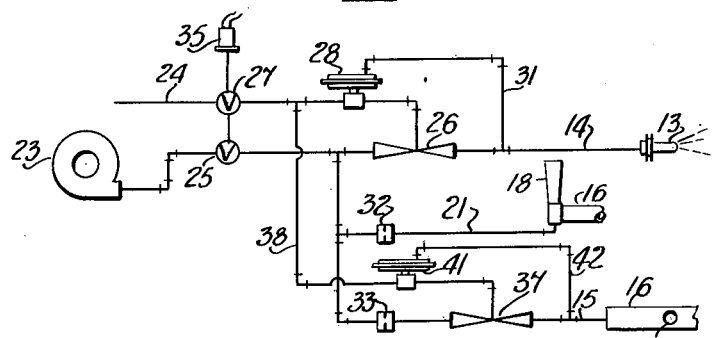
FIG. 6 is a schematic control diagram for an alternate control of the furnace of FIG. 1.

A second alternate control system is illustrated in FIG. 6 wherein pipe 15 delivers a lean mixture of fuel and air to the inlet of the radiant tube 16. Air passing through orifice 33 passes through an inspirator 37 which draws fuel through pipe 38 and pressure regulator 41, the regulator being back loaded to the pipe 15 downstream of the inspirator 37 by a pipe 42. Thus a lean fuel-air mixture is delivered to the inlet end of the tube 16 where it admixes with the rich furnace atmosphere drawn thereinto by eductors 18 and burns in stoichiometric combustion. This system generates more heat through the radiant tubes than combustion of the furnace atmosphere supplies.

Figure 7:
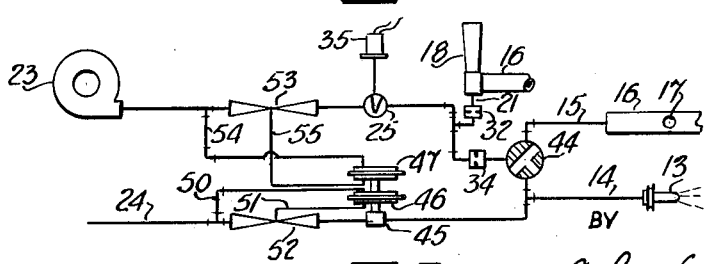
FIG. 7 is a schematic control diagram for an alternate control of the furnace of FIG. 1.

A third alternate control system is illustrated in FIG. 7 wherein the proportion of air to gas for perfect combustion is maintained by a double diaphragm control apparatus in the air and gas mains, the air being sufficient also to operate the eductor 18, and the air stream passes through the metering orifice 34, through a proportionally adjustable three-way valve 44, and thence to pipe 15 to the inlet end of the radiant tube 16, or through pipe 14 wherein it mixes with fuel from pipe 24 and passes to burner nozzle 13. Thus the total flow of gas and air through the radiant tube remains in constant proportion while the proportionate flow of air may be shifted from the burner to the radiant tube inlet to control the character of the furnace atmosphere as generated by the burner nozzle 13. In this system of FIG. 7, the double diaphragm control apparatus comprises a valve 45 in the gas pipe 24 which is diaphragm operated by two diaphragms 46, 47 in balance, one diaphragm 46 is pressure loaded by pipes 50, 51 to the entry and center portions of a venturi 52, and the other diaphragm 47 is pressure loaded to the entry and center portions of a venturi 53 by pipes 54, 55. Thus proportionate flows through the venturis 52 and 53 are maintained by appropriate adjustment of the double diaphragm operated valve 41 in the gas pipe 24.

I claim:

1. In a furnace, in combination, wall means forming a chamber for work to be heated; burner means in said wall means for supplying to said chamber a mixture of fuel and air which will react to supply heat to the chamber and to supply an atmosphere thereto, said mixture being deficient in oxygen to completely burn the fuel thereof; a radiant tube extending through said chamber in the region of said burner means and having an inlet in said chamber and an outlet outside said chamber; means for exhausting flue products from the outlet of said tube; and means for delivering air to the inlet of said tube whereby said air will admix with atmosphere drawn from the chamber into the tube and burn with the atmosphere in the tube to complete combustion of the fuel initially supplied to the furnace from said burner means, whereby fuel initially supplied to said burner means provides heat from direct first stage combustion in said chamber and subsequently supplies heat from second stage combustion in said radiant tube to the same region of said chamber, and work to be heated in said chamber simultaneously receives heat from said burner means and from said radiant tube.

2. In a furnace having walls forming a chamber for work to be heated, in combination, means for supplying free-oxygen free atmosphere to the chamber and for supplying heat thereto which comprises, burner structure in said walls for supplying to said chamber heat and gaseous products of combustion of a fuel and air mixture having less air than necessary to fully burn the fuel; radiant tube structure in said chamber having at its inlet end an inlet for atmosphere from the chamber and having its outlet end outside the chamber; an exhauster for exhausting products of combustion from the outlet end of the tube structure; a combustion air pipe for delivering air for combustion to the inlet end of the tube structure, and control means for proportioning the flow of fuel and air to the burner structure and to the tube structure to maintain substantially stoichiometric combustion in said tube structure.

3. In a furnace having walls forming a chamber for work to be heated, in combination, burner means for reacting in the chamber a mixture of fuel and air in proportions having fuel in excess of a stoichiometric mixture; a radiant tube disposed in the same chamber and adapted to heat by radiation the same work which is exposed to the heat of reaction from said burner means and having at its inlet end an inlet in the chamber for atmosphere from the chamber and at its outlet end an exhauster for exhausting to without the chamber products of combustion from the tube and an air nozzle for delivering to the inlet end of the tube air for combustion with fuel elements in the atmosphere entering said atmosphere inlet.

4. In a furnace according to claim 3, in combination, a source of fuel; a source of air under pressure; means for distributing proportioned streams of air from said air source to the burner means, the air nozzle, and the exhauster; and means for admixing with the air stream to the burner sufficient fuel to burn substantially completely with the air streams to the burner means and the air nozzle.

5. In a furnace according to claim 3, the combination wherein said burner means comprises a burner nozzle and a fuel nozzle, and comprising a source of fuel; a source of air under pressure; means for distributing proportioned streams of air from said air source to the burner nozzle and the air nozzle; means for delivering to the burner means sufficient fuel to burn substantially completely with said air streams; and means for proportioning the fuel delivered to the burner means into streams to the burner nozzle and to the fuel nozzle, the stream to the burner nozzle being proportioned to provide substantially stoichiometric combustion from the burner nozzle.

6. In a furnace according to claim 5, the combination wherein the means for distributing proportional streams of air also distributes a proportioned stream of air to the exhauster.

7. In a furnace according to claim 3, in combination, a source of fuel; a source of air under pressure; means for distributing proportioned streams of air from said air source to the burner means and the air nozzle; means for delivering to the burner means a stream of fuel proportioned to the stream of air thereto to provide a mixture containing fuel in excess of a stoichiometric mixture; and means for delivering to the air nozzle a stream of fuel proportioned to the stream of air thereto to provide a mixture containing air in excess of a stoichiometric mixture to the degree necessary to produce in said tube substantially stoichiometric combustion.

8. In a furnace according to claim 7, the combination wherein the means for distributing proportional streams of air also distributes a proportioned stream of air to the exhauster.

9. In a furnace according to claim 3, in combination, a source of fuel; a source of air under pressure; means for delivering first and second streams of air from said air source to the air nozzle and to the burner means; valve means for altering the proportional flow of said first and second air streams; and means for delivering to the burner means a stream of fuel from the fuel source at a rate proportioned to a stoichiometric mixture with the sum of the first and second air streams.

10. In a furnace according to claim 9, the combination wherein the means delivering first and second streams of air also delivers a third stream of air from said air source to the eductor at a rate proportioned to the sum of the first and second air streams.

11. In a furnace according to claim 3, in combination, a fuel duct forming a source of fuel; an air duct forming a source of air under pressure; an air metering device of the orifice type in the air duct; a fuel metering device of the orifice type in the fuel duct; means for delivering first and second air streams from said air duct to the air nozzle and to the burner means; means for delivering to the burner means a stream of fuel from said fuel duct; a double diaphragm operated valve in one of said fuel and air ducts having one of its diaphragms pressure loaded from the air metering device to move the valve in one direction responsive to flow through the air metering device and its other diaphragm pressure loaded from the fuel metering device to move the valve in the other direction responsive to flow through the fuel metering device; temperature responsive means in the furnace chamber; and valve means in the other of said ducts responsive to the temperature responsive means for varying flow through said valve means.

12. In the furnace according to claim 11, in combination, valve means for altering the proportional flow of air in said first and second air streams.

13. In the furnace according to claim 11, the combination wherein the means delivering first and second air streams also delivers a third air stream to the eductor at a rate proportioned to the sum of the first and second air streams.

14. The method of burning fuel in a furnace for heating work which comprises first burning fuel in the furnace with less air than necessary to fully burn the fuel to produce in the furnace chamber a free-oxygen free atmosphere for the work and then passing the atmosphere from the furnace chamber through at least one radiant tube disposed in the same chamber and admixing therewith sufficient air to complete the burning of the fuel in said tube whereby work in said chamber and enveloped by atmosphere generated by said first burning receives heat simultaneously from said first burning and the subsequent burning in said tube.

15. In a furnace, in combination, wall means forming a chamber for work to be heated; burner means in said wall means for supplying to said chamber a mixture of fuel and air which will react to supply heat to the chamber and to supply an atmosphere thereto; a radiant tube extending through said chamber and having an inlet in said chamber and an outlet outside said chamber; means for exhausting flue products from the outlet of said tube; and means for delivering air to the inlet of said tube whereby said air will admix with atmosphere drawn from the chamber into the tube and burn with the atmosphere in the tube to complete combustion of the fuel initially supplied to the furnace from said burner means.

16. The method of heating work and supplying a non-oxiding atmosphere therefor in a furnace chamber which comprises: emitting an ignited air and fuel mixture to the chamber in which said work is contained, emitting a second air and fuel mixture to one end of a radiant tube located in said chamber and whose ends projects therefrom, and allowing the first mixture to pass into said radiant tube and burn with said second mixture.

17. In a furnace comprising a chamber for work and a radiant tube containing at least one hole intermediate the ends thereof and extending through said chamber, the method of heating said work and supplying a non-oxidizing atmosphere therefor which comprises: emitting an ignited air and fuel mixture, whose proportion of fuel is greater than the stoichiometric proportion, to said chamber; passing a second mixture, whose proportion of fuel is less than the stoichiometric proportion, through said radiant tube, and passing the first mixture through the hole from said chamber to said radiant tube.

References Cited in the file of this patent

UNITED STATES PATENTS

| | | |
|---|---|---|
| 2,105,533 | Hess | Jan. 18, 1938 |
| 2,233,474 | Dreffein | Mar. 4, 1941 |
| 2,255,540 | Dreffein | Sept. 9, 1941 |
| 2,491,000 | Cone | Dec. 13, 1949 |
| 2,606,103 | Hamm | Aug. 5, 1952 |
| 2,753,170 | Ness | July 3, 1956 |
| 2,764,145 | Knight | Sept. 25, 1956 |